UNITED STATES PATENT OFFICE.

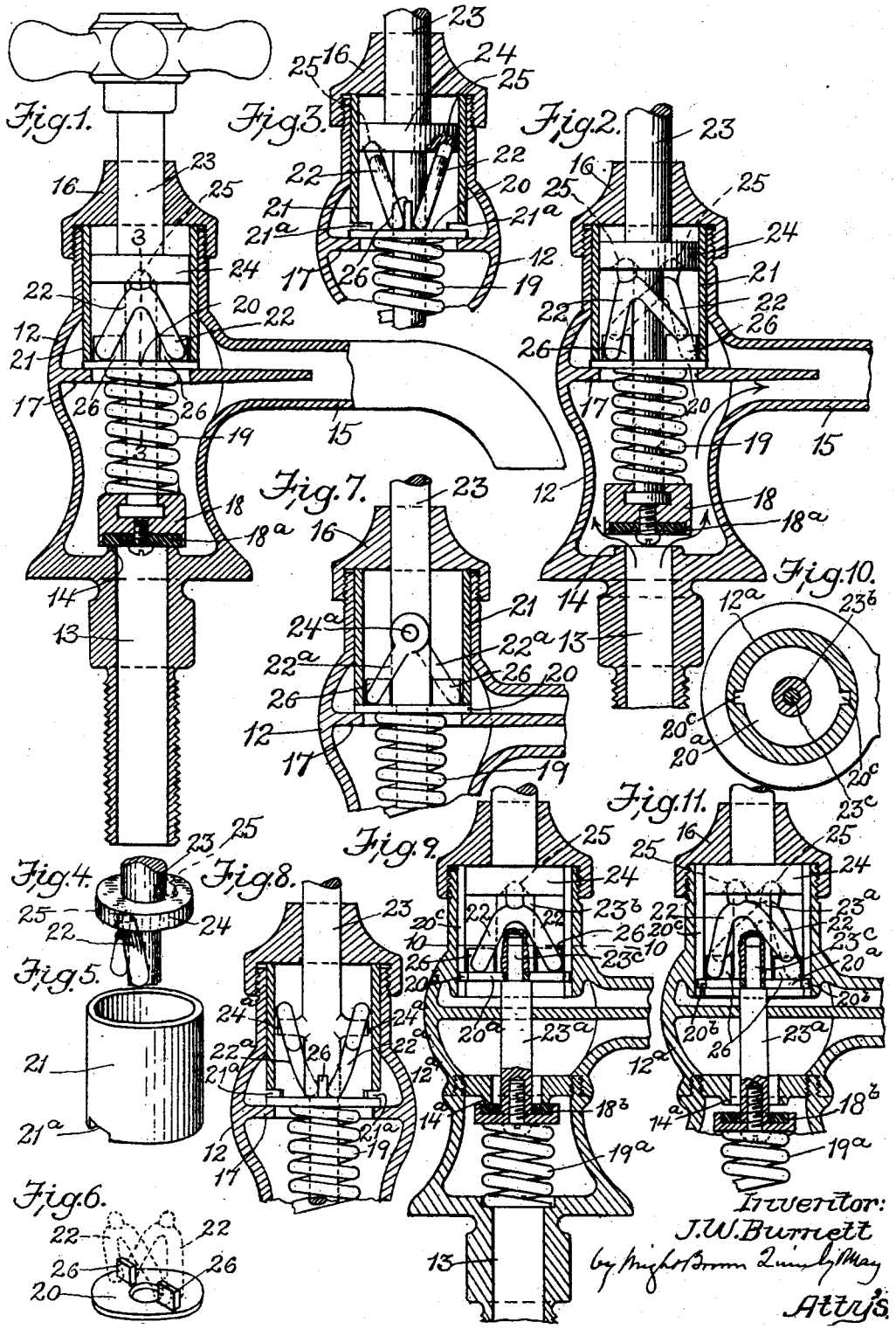

JOHN W. BURNETT, OF CAMBRIDGE, MASSACHUSETTS.

SELF-CLOSING FAUCET.

1,182,972. Specification of Letters Patent. Patented May 16, 1916.

Application filed September 30, 1915. Serial No. 53,221.

*To all whom it may concern:*

Be it known that I, JOHN W. BURNETT, a citizen of the United States, and resident of Cambridge, in the county of Middlesex and State of Massachusetts, have invented certain new and useful Improvements in Self-Closing Faucets, of which the following is a specification.

This invention relates to a faucet having a spring-closed valve adapted to be opened against the pressure of its closing spring by the partial rotation of a stem connected with the valve.

The invention has for its object to provide improved means for causing an opening movement of the valve when the stem is partly rotated, said means including toggle members adapted to overcome the pressure of a relatively strong spring when the stem is rotated.

The invention is embodied in the improvements which I will now proceed to describe and claim.

Of the accompanying drawings forming a part of this specification: Figure 1 represents an elevation of a faucet embodying my invention, the faucet casing and valve being shown in section and the valve being closed; Fig. 2 represents a view similar to Fig. 1, showing the valve open; Fig. 3 represents a fragmentary elevation showing the casing in section on the line 3—3 of Fig. 1, the valve stem, the spring, the abutment washer, and the toggle members hereinafter referred to being shown in elevation; Fig. 4 represents a perspective view of a portion of the valve stem and one of the toggle members thereon; Fig. 5 represents a perspective view of the sleeve hereinafter referred to; Fig. 6 represents a perspective view of the abutment washer, the toggle members hereinafter described coöperating with said washer being shown by dotted lines; Figs. 7 and 8 are fragmentary views similar to Figs. 1 and 2, showing a modification; Fig. 9 is a view similar to Fig. 1, showing another modification; Fig. 10 represents a section on line 10—10 of Fig. 9; Fig. 11 represents a view similar to Fig. 9, showing the valve open.

Similar reference characters indicate the same or similar parts in all the views.

Referring first to Figs. 1 to 6 inclusive, 12 represents the valve casing having an inlet 13 terminating in a valve seat 14, an outlet 15, a detachable bonnet 16 having a screw-thread engagement with the casing, and an internal ledge or shelf 17 between the bonnet and the valve seat, said ledge being located at one side of or above the liquid passage formed by the casing.

18 represents a valve, the compressible washer 18ª of which is normally held against the valve seat 14 by a spring 19, one end of which bears on the valve.

20 represents an abutment washer which is fixedly held on the ledge 17 by a sleeve 21 inserted loosely in the casing and pressed against the washer 20 by the bonnet 16. The washer 20 forms an abutment for one end of the spring 19 and an abutment for the struts 22 hereinafter described. Said washer is supported by the ledge 17 entirely outside a current of water flowing through the casing, and does not in any way restrict or interfere with said current.

The valve is provided with a stem 23 engaged at its inner end with the valve 18 preferably in such manner that the stem can rotate independently of the valve, said stem extending through the bonnet 16 and being adapted to turn or partially rotate therein. The stem is provided with a collar 24 which is rigidly attached to the stem, and may be considered as forming two radial toggle members, the stem and the radial toggle members turning and moving endwise together. Said collar is preferably provided in its under side with sockets 25 at diametrically opposite points, the collar 24 having a sliding fit in the sleeve 21.

It will be understood that the collar 24 may be considered as comprising arms projecting in opposite directions from the stem 23.

The struts 22 are preferably double acting and bifurcated, as shown by Figs. 1, 2, 3 and 6, said struts having terminals at their upper ends formed to have a rocking engagement with the sockets 25, their lower ends bearing on the abutment washer 20, which is provided with ears 26 constituting lateral thrust bearings which engage the lower ends of the struts, as clearly shown by Figs. 3 and 6. Said lower ends constitute spaced apart terminals. The struts 22 constitute complemental toggle members which are adapted to coöperate with the collar or radial toggle members on the valve stem and with the fixed abutment washer 20 in moving the valve against the pressure of the spring 19 from the closed position shown by Fig. 1 to the open position shown by Fig. 2. The toggle members are normally held in their inactive position by the spring 19, which by forcing the valve stem and its collar 24 downwardly maintains the struts 22 in inclined or oblique positions, as shown by Fig. 1. When the stem 23 is partially rotated, the struts swing, as indicated by Fig. 2, and thus cause an endwise movement of the valve stem and open the valve. In other words, the toggle members are moved to their active position by a partial rotation of the valve stem. When the stem is released the spring returns the toggle members to their inactive position shown by Fig. 1. Each of the said spaced-apart terminals is normally held by the spring 19 in separable rocking engagement with the abutment washers 20, said spaced terminals normally bearing on the washer whereby the toggle is maintained in its inactive position, the strut being incapable of swinging to a more pronounced inactive position when the two spaced terminals are seated on the washer. Either of said spaced terminals is separable from the washer by a rotary movement of the stem 23, the other terminal remaining in engagement with the washer. The valve is therefore adapted to be opened by a rotary movement of the stem in either direction with the minimum of frictional resistance.

I have found that the toggle members acting as described are adapted to easily open the valve against the pressure of a relatively heavy spring 19, so that a spring adapted to maintain a water-tight contact of the valve with its seat may be employed without involving objectionable difficulty in opening the valve.

In the embodiment of my invention shown by Figs. 1, 2 and 3, the valve closes against the inlet pressure, so that water hammer which usually attends the closing of the valve with the inlet pressure is avoided, my improvement at the same time enabling a sufficiently heavy spring to be employed to effectively resist the inlet pressure.

The bifurcated form of the struts 22 enables the valve to be opened by a turning movement of the stem in either direction, and is a desirable feature.

Figs. 7 and 8 show a modified construction, in which the radial toggle members on the valve stem are short arms or trunnions $24^a$ engaged with eyes on the struts $22^a$. In this modification each strut is a single bar instead of being a two-armed or bifurcated bar, so that the valve can be opened by a turning movement of the stem in one direction only.

Figs. 9, 10 and 11 illustrate a modification, in which the valve closes with the inlet pressure. In this modification the casing $12^a$ has a downwardly facing valve seat $14^a$ and the valve $18^b$ is closed upwardly against said seat by a spring $19^a$. The valve stem is composed of two sections $23^a$ and $23^b$, the former having a reduced extension $23^c$ which is movable endwise in the section $23^b$. The abutment washer $20^a$ is in this modification movable vertically with the valve and the stem section $23^a$, but is prevented from rotating by ears $20^b$ engaging slots $20^c$ in the casing. The outer section $23^a$ of the valve stem and the collar 24 attached thereto have no vertical movement, the collar being held by the spring $19^a$ against the bonnet 16. When the outer section $23^a$ of the valve stem is rotated the resulting movement of the toggle members to their active position depresses the abutment washer $20^a$, the stem section $23^a$, and the valve $18^b$, thus opening the valve, as indicated by Fig. 11.

While I have shown two radial toggle members projecting from opposite sides of the valve stem, and two coöperating toggle members interposed between the radial toggle members and the non-rotating abutment washer, it is obvious that my invention may be embodied in a faucet having only one radial toggle member on the valve stem and one toggle member bearing on the non-rotating abutment washer. The duplicate toggles are obviously preferable however because they equalize the pressure at opposite sides of the valve stem. It is also obvious that there may be more than two toggles, the valve stem being provided for example with three radial arms, each coöperating with a strut. The sleeve 21 should be provided with one or more openings $21^a$ (Figs. 3, 5 and 8) at its lower portion, to permit the drainage of water which may find its way into the sleeve.

It will be seen that in the casing structure shown by Figs. 1 to 8 inclusive, the abutment washer 20 and the sleeve 21 are detachably secured by the detachable bonnet 16, the construction permitting a quick and convenient assemblage and separation of said parts, and the washer being firmly supported, as above stated, by the ledge 17 above a stream of liquid flowing through the casing.

In the casing structure shown by Figs. 9, 10 and 11, the abutment washer is supported by the stem section $23^a$ above the stream of liquid.

Having described my invention, I claim:

1. A self-closing faucet comprising a casing forming a liquid passage and having a valve seat, a valve, a spring adapted to close the valve, a stem rotatable in the casing and provided with a radial toggle member, a non-rotating abutment washer located in the casing outside of said passage, and a double-acting strut constituting a complemental toggle member and having a terminal in rocking engagement with said radial member, and two spaced-apart terminals, each normally held by said spring in separable rocking engagement with said abutment washer, said spaced terminals normally bearing simultaneously on the washer to positively maintain the toggle members in their inactive position, and either of said spaced terminals being separable from the washer by a rotary movement of the stem, the other terminal remaining in engagement with the washer, whereby, when the stem is turned in either direction, the toggle members become active and open the valve.

2. A self-closing faucet comprising a casing forming a liquid passage and having a detachable bonnet, a valve seat, and an internal ledge located between the bonnet and valve seat and above said passage, a valve stem movable endwise and adapted to turn in said bonnet and provided with a radial toggle member and with a valve, both movable endwise with the stem, a non-rotating abutment washer seated on said ledge and supported thereby outside of said passage, a valve-closing spring interposed between the washer and valve and adapted to close the valve against the inlet pressure, a sleeve confined by the bonnet and confining the washer on the ledge against the pressure of the spring, and a strut interposed between the radial toggle member and the washer, and constituting a complemental toggle member, said toggle members being normally held in their inactive position by the spring, and movable to their active position by a partial rotation of the stem to open the valve, the sleeve and abutment washer being detachably secured by the bonnet.

In testimony whereof I have affixed my signature.

JOHN W. BURNETT.

Copies of this patent may be obtained for five cents each, by addressing the "Commissioner of Patents, Washington, D. C."